US007085001B2

(12) United States Patent
McKim

(10) Patent No.: US 7,085,001 B2
(45) Date of Patent: Aug. 1, 2006

(54) METHOD FOR APPLYING A MATERIAL ON A PHOTOCONDUCTOR

(75) Inventor: James E. McKim, Escondido, CA (US)

(73) Assignee: Aetas Technology, Inc., Irvine, CA (US)

( * ) Notice: Subject to any disclaimer, the term of this patent is extended or adjusted under 35 U.S.C. 154(b) by 1051 days.

(21) Appl. No.: 09/955,611

(22) Filed: Sep. 19, 2001

(65) Prior Publication Data

US 2003/0053139 A1 Mar. 20, 2003

(51) Int. Cl.
*G06K 15/00* (2006.01)

(52) U.S. Cl. .......................................... 358/1.5; 101/92

(58) Field of Classification Search .................. 101/37, 101/40.1, 91, 92; 346/136; 156/554; 358/1.3, 358/1.5, 1.18, 501, 401, 504, 406, 471
See application file for complete search history.

(56) References Cited

U.S. PATENT DOCUMENTS 3,791,293 A * 2/1974 Rastorguyeff et al. ...... 101/234
3,951,061 A * 4/1976 Bremmer et al. ........ 101/93.12
4,227,960 A * 10/1980 Loeffler et al. ............ 156/519
4,281,334 A * 7/1981 Moore et al. .............. 347/157
4,281,335 A * 7/1981 Moore et al. .............. 347/157
4,347,525 A * 8/1982 Moore et al. .............. 347/157
5,261,996 A * 11/1993 Rossini ...................... 156/521
5,482,593 A * 1/1996 Kuhn et al. ................. 156/521
6,536,702 B1 * 3/2003 Vargo et al. ............ 242/530.2
2003/0053139 A1 * 3/2003 McKim ...................... 358/300

* cited by examiner

*Primary Examiner*—Jerome Grant, II
(74) *Attorney, Agent, or Firm*—Frederic M. Douglas

(57) ABSTRACT

The present invention is an automated arrangement for applying strip material to a web belt. One purpose of the present invention is to provide a solution to the known problem of securing material to an organic photoconductor ("OPC") belt material in an automated manufacturing environment. Usually, material is applied to an OPC belt by hand. Hand application of strip material is time-consuming, costly, and prone to inaccurate placement on the OPC belt. The extra time taken to apply the strip material by hand increase the OPC belt's exposure to light, which can damage the OPC material. Furthermore, pulling the strip by hand can deform the strip because of excessive force used to pull the strip before application. Thus using an automated, controlled process to apply material minimizes damage to the belt and strip, resulting in higher yield of belts and strips per spool.

34 Claims, 2 Drawing Sheets

METHOD FOR APPLYING A MATERIAL ON A PHOTOCONDUCTOR

FIELD OF THE INVENTION

The present invention relates generally to a process of attaching a substance to a web material. The present invention may be used to apply strip material to non-printer applications, such as automobile tire manufacture or any other application where a strip material is applied to a web material. In one embodiment, the present invention applies a polymer strip with alternating fiducial markings, encoded into the strip, onto the surface of a photoconductive belt. The encoded strip serves to characterize belt motion to enhance image print quality by delivering precise locations of the belt as it moves through an electrophotographic imaging system.

REFERENCE TO OTHER APPLICATIONS

The entire contents of U.S. application Ser. No. 09/718,069, assigned to the present assignee, are hereby incorporated by reference. Also, the entire contents of U.S. application Ser. No. 09/892,425, assigned to the present assignee, are hereby incorporated by reference.

BACKGROUND OF THE INVENTION

Electrophotographic ("EPG") printing involves the use of an image carrying member that is initially charged to a substantially uniform potential. An electrostatic latent image is formed on the photoconductor, usually by way of a light source, which discharges the charged photoconductor in selected areas. The latent image is then transferred by bringing a developer material, typically a toner, into contact with the photoconductor surface. The developed image is then transferred to a recording sheet (e.g. paper sheet, transparency sheet) and permanently affixed thereto by fusing with applied heat and pressure.

An encoded strip provides a solution to the known motion control problems when using an organic photoconductor "OPC" belt in an EPG apparatus. Imaging systems require the OPC belt to move and/or rotate within the system and require the movement or motion quality to be very accurate and free from vibrations or slips. A belt does not provide a stable surface when rotating around a plurality of rollers. The belt will laterally shift in one direction or another. This shift causes poor image quality. This problem is exaggerated in a tone-on-tone EPG developing system where accuracy is very important when placing a particle of toner, which is about 12 microns in diameter on top of another particle of toner, which is also about 12 microns in diameter. The present invention solves the problem of shifting of a belt in a tone-on-tone EPG developing system by placing a thin printed strip which could be printed directly onto the belt or printed on tape which adheres to the belt and mounting an optical sensor in a close relation to the strip. Thus, if an OPC belt does slip or become misaligned, the imaging system's controller will be able to compensate for the error by shifting key set points in the imaging system. The photoconductor can be comprised of a drum or belt, which is made of an organic material. One purpose of the present invention is to provide a solution to the known problem of securing material to an organic photoconductor ("OPC") belt material in an automated manufacturing environment. Usually, material is applied to an OPC belt by hand. Hand application of strip material is time-consuming, costly, and prone to inaccurate placement on the OPC belt. The extra time taken to apply the strip material by hand increase the OPC belt's exposure to light, which can damage the OPC material. Furthermore, pulling the strip by hand can deform the strip because of excessive force used to pull the strip before application. Thus using an automated, controlled process to apply material minimizes damage to the belt and strip, resulting in higher yield of belts and strips per spool. Accordingly, it is an object of the present invention to provide a low cost, practical, and efficient manner of adhering a continuous encoder strip ("code strip") to achieve a desired print registration for printers, copiers, input scanners, and other related machines.

Thus, when the belt shifts, the pattern will also shift. When the pattern shifts, the sensor will read the shift and inform the controller of the EPG developing system to shift the light source to compensate for the misalignment ("misregistration").

The use of a code strip and a sensor, shown in FIG. 5, enables supplying the system's controller with the exact location of the OPC belt. Placing a pattern, shown in FIGS. 3A and 3B, on the code strip, that can show two variables, the X-direction and the Y-direction and using an algorithm to define the exact location of the OPC belt.

The present invention relates to the art of encoding the movement of an OPC belt. Imaging devices require that the image transferred onto the OPC be registered accurately with the image light source. A code strip helps establish the position of a marking or sensing device mounted for exposing across a printing medium on which an image is to be printed, or from which an image is to be read.

A code strip is a graduated strip, generally disposed across an area where the medium is held, and having gradations that can be automatically sensed. Historically code strips have been made of polymer material with fiduciary markings formed photographically. For optimum performance, the code strip's fiduciary markings should be very close to both a light source and a detector used as parts of a sensing system for reading the fiduciary markings.

A code strip obviates the need for an encoder wheel or roller, as the strip rides along with the OPC belt in concert with the belt's motion. Instead of using a large diameter roller, a thin strip attached or printed to the belt surface occupies negligible space in the printer architecture. Without an encoder roller, the two greatest contributions to misregistration, roller runout and eccentricity, disappear. The space saved can be used by other hardware. Color systems require substantial hardware space for multiple development stations, erase stations, charging stations, and light sources. Multiple pass systems require the OPC belt to revolve several times. Each cycle can multiply the effects from roller tolerances. Using a code strip that moves with the belt provides more accurate data about the belt motion.

SUMMARY OF THE INVENTION

The code strip is applied to the belt web material before the material is cut, wrapped, and spliced. As the web material is fed from a supply spool, code strip material is supplied from its respective supply spool and applied to the web surface. The code strip spool consists of layers of code strip separated by liner material, such as paper, attached to the strip bottom surface by means of an adhesive.

The strip, with liner attached, is fed past a pulley into the initial guide, where the strip is aligned for placement over vacuum ports on the outer circular surface of the applicator wheel. Negative pressure retains the strip on the applicator wheel surface. As the applicator wheel rotates clockwise, the strip rises towards the belt web material. The stationary liner stripper rod impinges between the strip and liner material.

The liner material is removed from the code strip to expose the adhesive. The liner material is diverted away from the code strip path towards a pinch wheel and chopper, and into a waste receptacle. The guide sensor detects the position of the strip after the liner is removed. The strip must align correctly to adhere to the correct area of the web material.

The code strip, with pressure-sensitive adhesive exposed and oriented upwards, continues with the applicator wheel rotation to adhere to the underside of the belt web material where the applicator nip roll presses the web material ("nip location"). The code strip adheres to the belt material upon application of the pressure between the nip roll and the applicator wheel. After the code strip is secured to the web bottom surface, the strip and web move together away from the nip location.

Portions of web material are formed into loops. One end of a sheet of web material is joined to another end of the web material. To further image quality, imaging should not occur at the joint (e.g. welded seam or splice). The present invention avoids applying material at the joint site. Accordingly, the imaging system would need to incorporate some type of sensing means to locate the joint. Unlike prior art that suggests the use of a hole or notch cut into the belt (and pose a mess by collecting toner), the use of code strip avoids this problem. By not placing code strip at the splice, as shown in FIG. 4, the sensing means described above would signal to the imaging system's controller the location of the splice.

In addition, the joint could be detected by utilizing the XY patterns located on the code strip itself. Since there is a defined number of XY pattern stripes (see FIG. 3) within the code strip (e.g., n stripes per inch of code strip), the central processing unit can determine the position of the slice as a certain distance away from the XY pattern stripe (e.g., stripe #238 of 4,000 total stripes within the code strip) that has just been detected by the sensing means.

In "Method and System for Compensating for an Offset in an Imaging System" (U.S. patent application Ser. No. 09/718,069), compensation can be directed when lasers, LED chips, LED arrays, individual LED's within an array, or LED print heads (LPH's) are misaligned. Any misalignment regarding the LED or its housing (which can occur during assembly, installation, or operation) would result in an image misregistration.

Similarly, in the case of OPC belt misalignment, slippage or misregistration, the light sources (either individually or collectively as an array) would compensate accordingly. The central processing unit, after receiving a signal of belt misregistration, would direct the light sources (either through software or firmware) to compensate for the misregistration (e.g., different LED's would be engaged in sequences and overall timing than what would normally occur without the belt misregistration).

In another embodiment of the present invention, as shown in FIG. 3, a guideband 47 is applied to one or both margins of the OPC belt. One of the applications of the guideband 47 is to prevent a belt from slipping off of a belt roller. The manner of application is substantially the same as applying codes strip to a web, as disclosed herein. Still, other advantages and benefits of the invention will become apparent to those skilled in the art upon a reading and understanding of the following detailed description.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views. The invention may take physical form in certain parts and arrangements of parts a preferred embodiment of which will be described in detail in this specification and illustrated in the accompanying drawings, which form a part hereof, wherein.

DETAILED DESCRIPTION OF THE PREFERRED EMBODIMENT

Figures 1, 2:
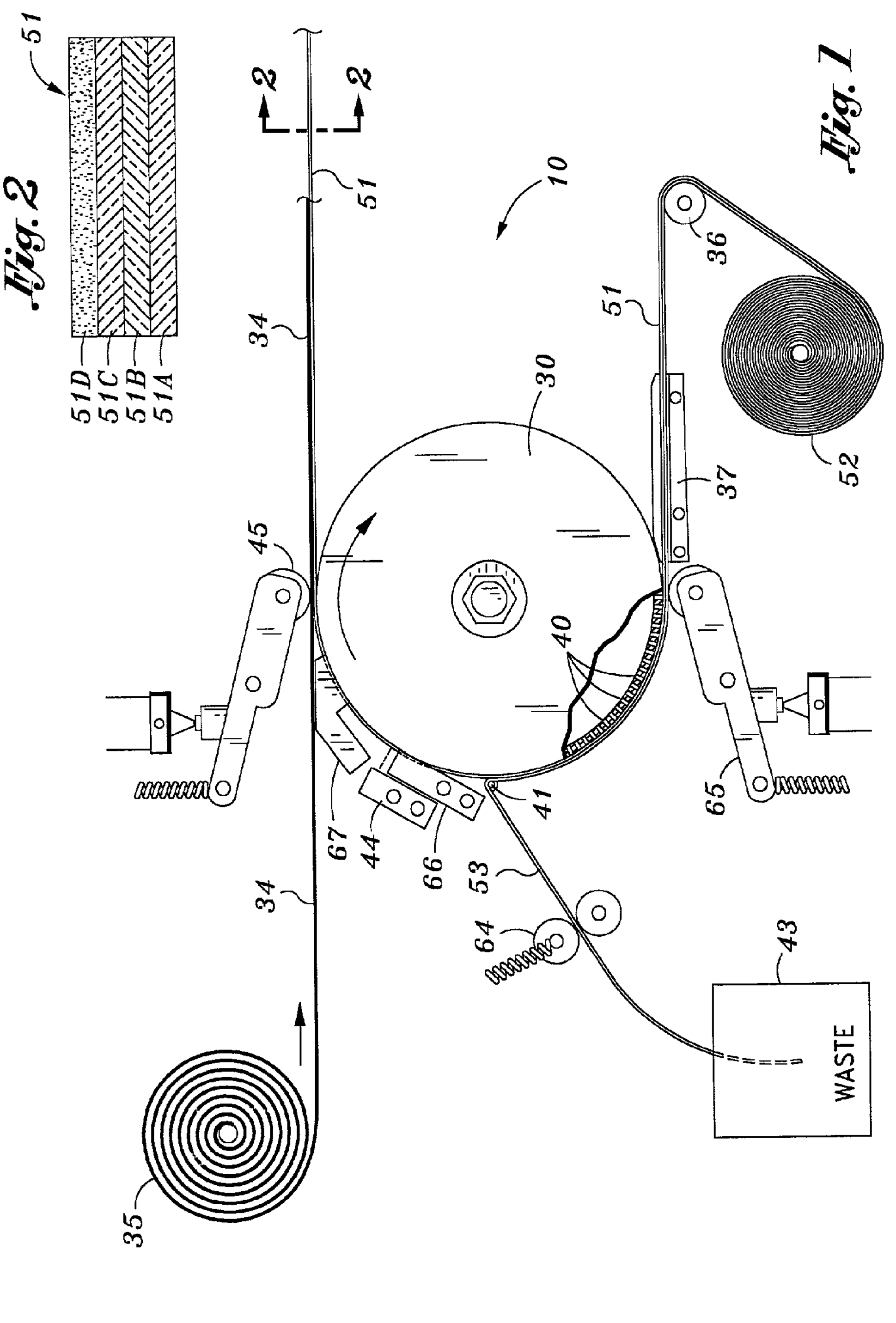
FIG. 1 is a schematic diagram illustrating an apparatus according to the present invention.
FIG. 2 is an illustration of the layers in a code strip according to the present invention.

Referring now to the drawings wherein the showings are for the purposes of illustrating the preferred embodiment of the invention only, and not for purposes of limiting the same, the figures show an EPG printing apparatus having a code strip according to the present invention.

As shown in FIG. 1, the code strip attachment apparatus 10 has an applicator wheel 30 with vacuum ports 40 evenly spaced along the circumference of the applicator wheel 30. As best shown in FIG. 1, OPC belt web material 34 is fed from a supply spool 35. As the web material 34 is fed from the supply spool 35, code strip material 51 is supplied from its respective supply spool 52 and applied to the web surface. The code strip spool 52 consists of layers of code strip material 51 separated by liner material 53, such as paper, attached to the strip bottom surface by means of an adhesive 51D. The strip 51, with liner 53 attached, is fed past a pulley 36 into the threading guide member 37 and pressed by nip roll 65, where the strip 51 is aligned for placement over vacuum ports 40 on the outer circular surface of the applicator wheel 30. A vacuum commutator seal (not shown), located inside the applicator wheel, helps select the vacuum ports 40 where vacuum is applied. The strip 51 contains several layers, including, fro example, a structural base 51A, film emulsion 51B, reflective mylar 51C, and optical adhesive 51D. As the applicator wheel 30 rotates clockwise, the strip 51 rises towards the belt web material 34. The stationary liner stripper rod 41 impinges between the strip 51 and liner material 53.

The liner material 53 is removed from the code strip 51 to expose the adhesive 51D. The liner material 53 is diverted away from the code strip feed path, past a waste liner pinch roller 64, and into a waste receptacle 43. The guide sensor 44 detects the position of the strip 51 after the liner 53 is removed. The strip 51 must align correctly to adhere to the correct area of the web material 34. Alignment is guided by initial guide 66 and final guide 67.

The code strip 51, with pressure-sensitive adhesive 51D exposed and oriented upwards, continues with the applicator wheel 30 rotation to adhere to the underside of the belt web material 34 where the applicator nip roll 45 presses the web material 34. The code strip 51 adheres to the belt material 34 upon application of the pressure between the nip roll 45 and the applicator wheel 30. After the code strip 51 is secured to the web bottom surface, the strip 51 and web 34 move together away from the nip location.

Figure 3:
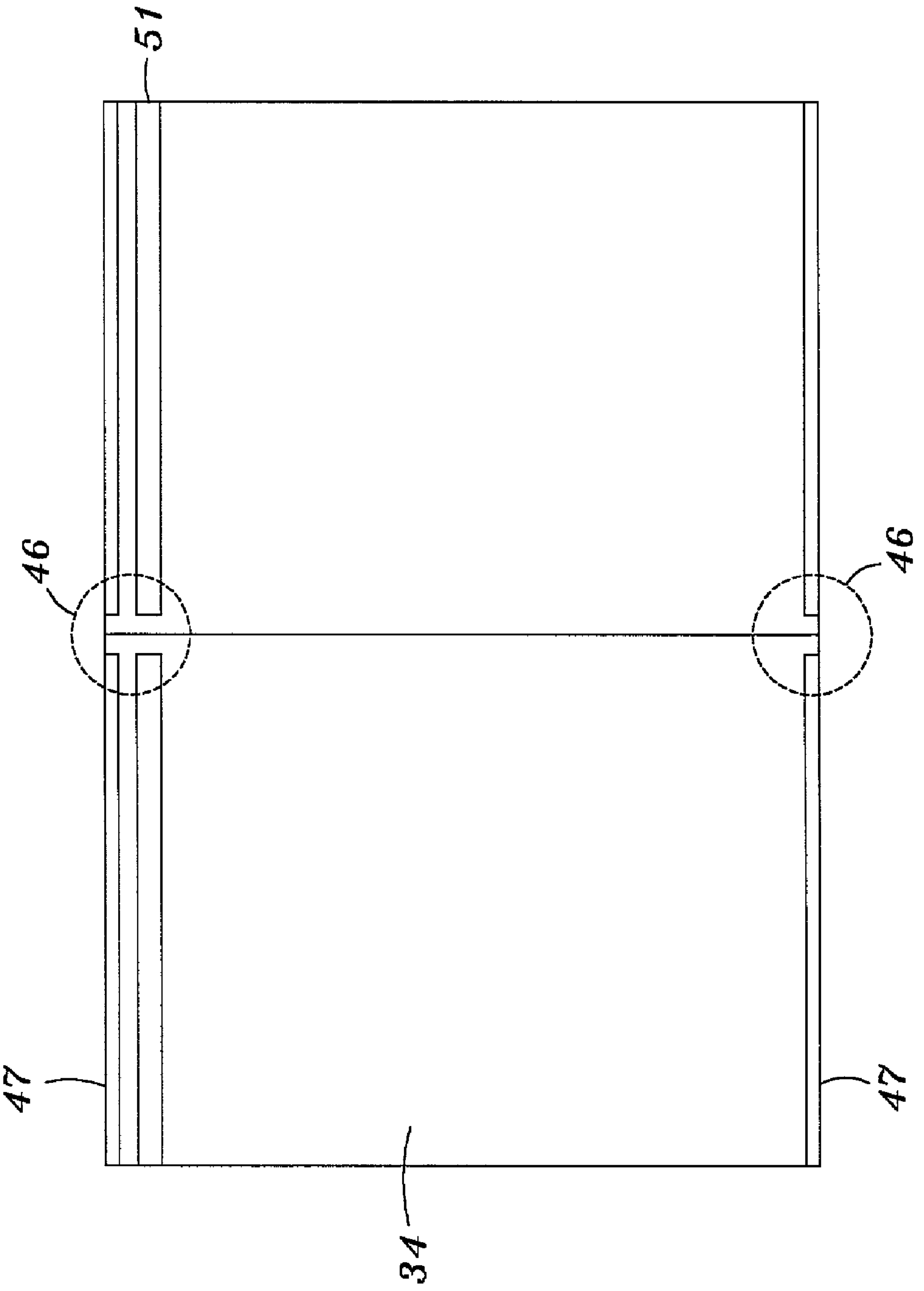
FIG. 3 is an illustration of an OPC belt containing a code strip, but not containing code strip material around joint area.

Referring to FIG. 3, to further image quality, imaging should not occur at the joint site 46. The joint site may be formed by welding, splicing or other methods of joining ends of material. The present invention avoids applying material at the splice site. Predetermined lengths of strip material 51 are placed onto the web 34. Likewise, predetermined lengths of guideband material 47 may be placed onto the web 34. Accordingly, the imaging system would need to incorporate some type of sensing means to locate the splice. Unlike prior art that suggests the use of a hole or notch cut into the belt (and pose a mess by collecting toner), the use of a code strip avoids this problem. By not placing a code strip at the splice, as shown in FIG. 3, the sensing means described above would signal to the imaging system's controller the location of the splice.

Also, the splice could be detected by utilizing the XY patterns located on the code strip itself. Since there is a defined number of XY pattern stripes (see FIG. 3) within the code strip (e.g., n stripes per inch of code strip), the central processing unit can determine the position of the slice as a certain distance away from the XY pattern stripe (e.g., stripe #238 of 4,000 total stripes within the code strip) that has just been detected by the sensing means.

The invention has been described with reference to the preferred embodiments. Obviously, modifications and alterations will occur to others upon a reading and understanding of the specification. For example, the concept of the present invention is also applicable to printing techniques involving more than four-color printing and to the retrofit of existing apparatus. Another example is applying guideband material 47 to a web 34. The present invention is intended to include all such modifications and alterations as far as they come within the scope of the appended claims or the equivalents thereof.

The invention claimed is:

1. An apparatus for applying a strip material to a web, comprising:

an applicator wheel;

a guide member to provide a path for said strip material; and a guide sensor to detect the position of said strip material;

wherein the web comprises an organic photoconductor material.

2. The apparatus according to claim 1, in which said strip material comprises a code strip.

3. The apparatus according to claim 2, in which said applicator wheel contains vacuum ports along the circumference of said applicator wheel.

4. The apparatus according to claim 3, in which XY patterns are located on said code strip.

5. The apparatus according to claim 1, in which said applicator wheel contains vacuum ports along the circumference of said applicator wheel.

6. The apparatus according to claim 5, in which said strip material comprises a code strip.

7. A method for applying a strip material to a web, comprising the steps of:

(a) feeding a length of strip material into an initial guide member;

(b) transporting said strip material towards an applicator wheel;

(c) detecting the position of said strip material;

(d) aligning said strip material with a bottom surface of an organic photoconductor web; and (e) securing said strip material to said surface of said organic photoconductor web.

8. The method according to claim 7, in which step (b) includes aligning said strip material for placement over vacuum ports on the surface of said applicator wheel.

9. A method for applying a strip material to an organic photoconductor web, comprising the steps of:

(a) feeding a length of strip material into an initial guide member;

(b) transporting said strip material towards an applicator wheel;

(c) detecting the position of said strip material;

(d) aligning said strip material with the surface of said organic photoconductor web;

(e) securing said strip material to said surface of said organic photoconductor web.

10. The method according to claim 9, in which step (b) includes aligning said strip material for placement over vacuum ports on the surface of said applicator wheel.

11. A method for applying a code strip material to a web, comprising the steps of:

(a) feeding a length of code strip material into an initial guide member;

(b) transporting said code strip material towards an applicator wheel;

(c) detecting the position of said code strip material;

(d) aligning said code strip material with the surface of an organic photoconductor web; and (e) securing said code strip material to said surface of said organic photoconductor web.

12. The method according to claim 11, in which said strip material comprises a code strip made of polymer material with fiduciary markings formed photographically.

13. The method according to claim 12, in which XY patterns are located on said code strip.

14. The method according to claim 11, in which a guide sensor detects the position of said code strip material.

15. The method according to claim 11, in which step (e) is followed by a step of forming a loop from said web material.

16. The method according to claim 15, in which said loop contains a welded seam.

17. The method according to claim 16, in which said strip material is not adhered to the portion of said web that later contains a welded seam.

18. The method according to claim 15, in which said loop contains a splice.

19. The method according to claim 18 in, which the strip material is not adhered to the portion of said web that is later spliced.

20. An apparatus for applying a guide band to a web, comprising:

an applicator wheel;

a guide member to provide a path for said guideband; and a guide sensor to detect the position of said guideband;

wherein the web comprises an organic photoconductor material.

21. The apparatus according to claim 20, in which said applicator wheel contains vacuum ports along the circumference of said applicator wheel.

22. A method for applying a guideband to a web, comprising the steps of:

(a) feeding a length of guideband into an initial guide member;

(b) transporting said guideband towards an applicator wheel;

(c) detecting the position of said guideband;

(d) aligning said guideband with the surface of an organic photoconductor web;

(e) securing said guideband to said surface of said organic photoconductor web.

23. The method according to claim 22, in which step (b) includes aligning said strip material for placement over vacuum ports on the surface of said applicator wheel.

24. A method for applying a guideband to an organic photoconductor web, comprising the steps of:

(a) feeding a length of guideband into an initial guide member;

(b) transporting said guideband towards an applicator wheel;

(c) detecting the position of said guideband;

(d) aligning said guideband with the surface of said organic photoconductor web;

(e) securing said guideband to said surface of said organic photoconductor web.

25. The method according to claim 24, in which step (b) includes aligning said strip material for placement over vacuum ports on the surface of said applicator wheel.

26. A method for applying a guideband to a web, comprising the steps of:

(a) feeding a length of guideband into an initial guide member;

(b) transporting said guideband towards an applicator wheel;

(c) detecting the position of said guideband;

(d) aligning said guideband with the surface of an organic photoconductor web;

(e) securing said guideband to said surface of said organic photoconductor web.

27. The method according to claim 26, in which step (e) includes securing said guideband with an adhesive material.

28. The method according to claim 27, in which said adhesive material is a pressure-sensitive adhesive.

29. The method according to claim 26, in which step (e) is followed by a step of forming a loop from said organic photoconductor web.

30. The method according to claim 29, in which said loop contains a welded seam.

31. The method according to claim 30, in which said guideband is not adhered to the portion of said organic photoconductor web that later contains a welded seam.

32. The method according to claim 29, in which said loop contains a splice.

33. The method according to claim 32, in which said guideband is not adhered to the portion of said organic photoconductor web that is later spliced.

34. The method according to claim 26, in which a guide sensor detects the position of said guideband.

* * * * *